Sept. 8, 1931.  F. N. PETRIE  1,822,785

FISHING SPINNER

Filed June 7, 1930

INVENTOR.
Frank N. Petrie

BY *Lancaster, Allwine and Rommel*
ATTORNEYS.

Patented Sept. 8, 1931

1,822,785

UNITED STATES PATENT OFFICE

FRANK N. PETRIE, OF KLAMATH FALLS, OREGON

FISHING SPINNER

Application filed June 7, 1930. Serial No. 459,770.

The present invention relates to fishing spinners or lures of the character that have revoluble parts set in motion by engagement with the water as they are drawn therethru.

The principal object of the invention is to provide spinners which are rendered unusually attractive to fish by the cooperation of beads, having a multiplicity of facets, and blades, revoluble about wire shanks, the beads and blades being independently revoluble about the shanks and the blades and facets of the beads reflecting light rays in a dazzling manner.

Another object of the invention is to provide spinners utilizing stock beads, such as of glass, as lures, preferably red in color, which are protected by the blades of the spinners so that they are not likely to be broken.

A further object of the invention is to provide a spinner with a bead or a series of beads and blades mounted on a shank, common to both, which permits a limited amount of lateral movement of the bead or beads, relative to the blades, so that the hooks may trail with a certain amount of freedom.

A further object of the invention is to provide a spinner which is compact, sturdy, and inexpensive to manufacture.

Other objects and advantages of the invention will appear in the following detailed description, taken in connection with the accompanying drawings, forming a part of this specification and in which drawings.

In the drawings where similar characters designate similar parts. A designates the shank, B a rotor carried by the shank, and C reflectors on the shank.

Figure 1:
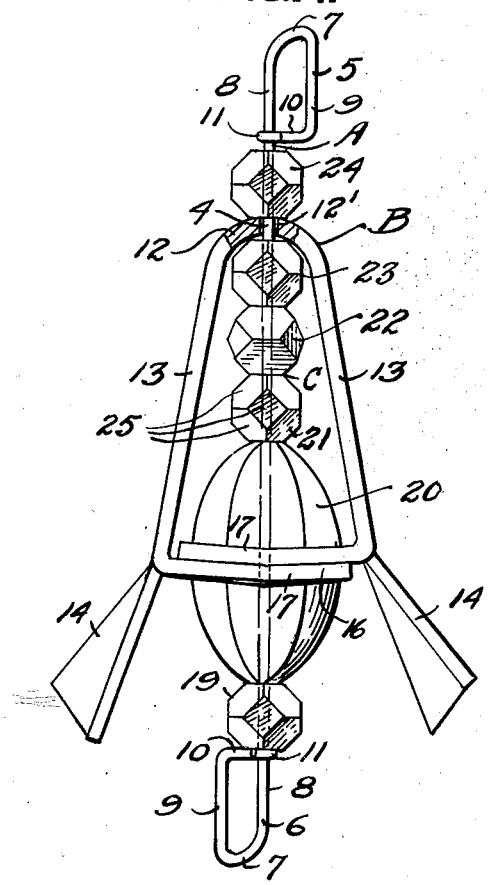
Figure 1 is a view in elevation, showing the beads or reflectors, a portion being broken away and shown in section to disclose details.
Figure 2:
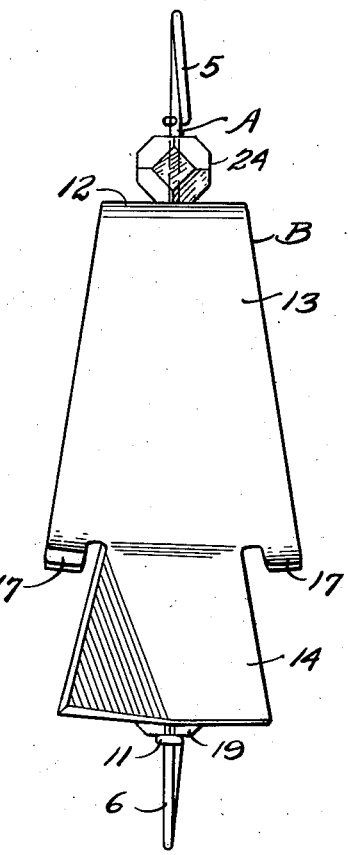
Figure 2 is a similar view but looking toward the face of one of the blades.

The shank A is preferably of wire and includes a main body portion 4, an upper eye 5 and a lower eye 6, these eyes intended to receive the conventional swivels, not shown in the drawings, for connection with the line and hooks. Each eye may comprise a bight portion 7, arm portions 8 and 9 extending therefrom, the former being a continuation of the main body part 4 and co-axial therewith, and a return bend 10 having a ring portion 11 encircling the main body portion 4. It is preferred to dispose these eyes at opposite sides of the longitudinal axis of body portion 4 so that when the spinner is in use the body portion 4 will not be directly in the line of pull, and having a tendency to cause the spinner to dart to opposite sides of a straight path when drawn thru the water.

Figure 3:
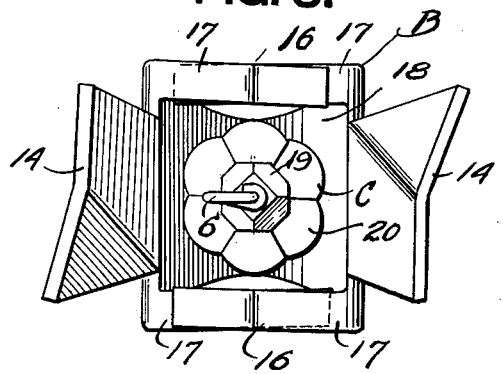
Figure 3 is a bottom plan view.

The rotor B preferably comprises a bight portion 12, provided with a perforation 12', thru which the main body 4 of shank A freely extends; wings or blades 13 extending from the bight portion 12, preferably in diverging relation therefrom and having twisted terminal portions 14, shaped to cause the rotor to revolve about the shank A when the spinner is drawn thru the water; and, means 16 extending laterally from the blades 13 to embrace the reflector C with limited freedom of movement of the latter between the blades, as may be observed from an inspection of Figure 3. The rotor may be conveniently made of a stamping from sheet metal, the means 16 comprising arms 17 extending laterally from the blades and in overlapping relation, as shown in Figures 1 and 3, thus providing a well 18 in which the reflector C may move.

As to the reflector C, it is preferably made of a series of beads 19, 20, 21, 22, 23 and 24. These may be of glass, freely revoluble on the shank portion 4. They may vary in size, and in the example shown the bead 20 is elongate in shape and is a major reflector as compared with the minor reflectors 19, 21, 22, 23 and 24. Each bead is provided with a plurality of facets 25 which reflect light rays coming directly thereupon as well as those reflected from the polished surfaces of the rotor B.

In the example shown, the series of beads 19, 20, 21, 22 and 23 are interposed between the bight portion 12 of the rotor and the eye 6 which serves as a lower abutment, and the bead 24 is interposed between the bight portion 12 of the rotor and the upper eye or abutment 5, which acts as an abutment at the opposite end of the shank.

When the spinner is brought into use, interposed between the hooks and the line, water acting upon the twisted end portions 14 of the blades 13 will cause the rotor B to revolve about shank A and this may also have a tendency to cause some or all of the beads to also revolve, or at least the bead 23, much depending upon the speed with which the spinner is drawn thru the water and hence the pressure upon the blades 13. The revolving rotor will reflect light rays, as will also the beads and some of the light rays reflected from the rotor will be reflected from the beads in a dazzling manner.

While, in the example shown, I have shown a series of beads to constitute the reflectors, carried by the shank A, it is to be understood that this is merely by way of example, and likewise formation of the rotor with a plurality of blades, and made from a metal stamping, is merely by way of example, it being understood that the invention may be subjected to changes in details without departing from the spirit of the invention as claimed.

I claim:

1. A spinner comprising a shank provided with upper and lower abutments at its ends, a series of beads strung on said shank extending from adjacent the lower abutment, a blade revolubly carried by said shank at the end of said series of beads opposite said lower abutment, and a bead between the pivotal connection of said blade with said shank and the upper abutment.

2. A spinner comprising in combination, a shank, an elongate reflector carried thereby, and a rotor including a bight portion thru which said shank freely extends, blades extending from said bight portion at opposite sides of the reflector whereby the blades will move in a path about the reflector when the spinner is drawn thru the water, and means extending laterally from said blades to embrace the reflector with limited freedom of movement of the latter between the blades.

FRANK N. PETRIE.